Nov. 2, 1948.  J. R. CAUTLEY  2,452,633
MEANS FOR CAUSING PREROTATION OF AIRCRAFT WHEELS
Filed Feb. 17, 1945

INVENTOR.
JOHN R. CAUTLEY
BY
*L. J. Plante*
ATTORNEY

Patented Nov. 2, 1948

2,452,633

UNITED STATES PATENT OFFICE 2,452,633

MEANS FOR CAUSING PREROTATION OF AIRCRAFT WHEELS

John R. Cautley, South Bend, Ind., assignor to Bendix Aviation Corporation, South Bend, Ind., a corporation of Delaware Application February 17, 1945, Serial No. 578,511

7 Claims. (Cl. 244—103)

This invention relates to pre-rotation of aircraft wheels, or in other words, to means for causing rotation of aircraft wheels preparatory to landing.

The obvious advantage in a pre-rotation arrangement is that the speed of movement of the tire periphery may be made to approach the landing speed of the aircraft, and thereby reduce tire wear. Devices for accomplishing pre-rotation have heretofore been proposed, but, in the main, they have failed to provide a full answer to the problem either because they could not develop sufficient wheel speed, or because they were too complex and expensive.

The primary object of the present invention is to provide improved means for causing rotation of aircraft wheels preparatory to landing, said means being improved both as to ability to produce a rapid rotation of the wheels and as to simplicity of construction.

Figure 1:
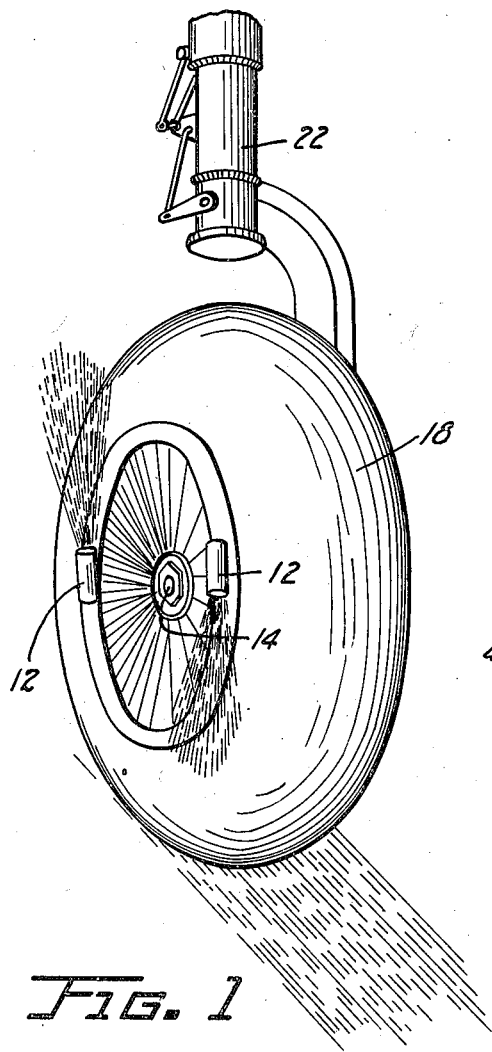
Figure 2:
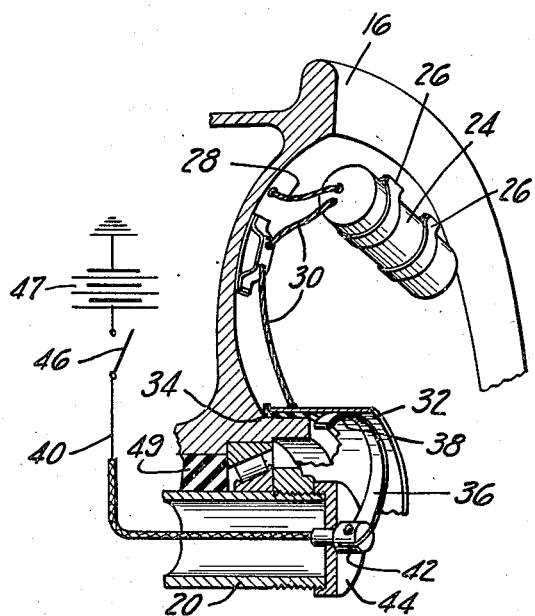

Other objects and advantages of the present invention will become apparent during the course of the following description, reference being had therein to the accompanying drawings, in which:

Figure 1 shows the means for causing pre-rotation applied to an airplane wheel; and Figure 2 is a generally diagrammatic showing of a possible control arrangement for the wheel rotating device of Figure 1.

Broadly, I propose to cause rotation of aircraft wheels preparatory to landing by means of one or more rockets, set off at the proper time by means either manually or automatically controlled.

Because the wheels of aircraft are not driven, their rotation as the aircraft moves along the ground is caused by ground friction. When the aircraft lands at a high speed, the wheels, which do not rotate before the plane hits the ground must develop an exceptionally high speed in a very short time after ground contact. As a result of this, an excessive amount of tire rubber is worn off with each landing. This condition can be remedied in large measure if efficient means can be provided to cause the wheel to rotate at a fairly high speed just before the airplane lands, thereby avoiding the relative sliding movement between the tires and the ground which is most injurious to the tires.

As illustrated in Figure 1, I propose to provide one or more rockets 12, utilizing any preferred type of fuel, which are located at a distance from the axis of rotation 14 of the wheel 16. The rockets should be located as far as possible from the axis of rotation of the wheel in order that the pressure created by said rockets will have a maximum turning moment. However, the position of the rockets must be such that their exhaust will not injure the tire 18. The wheel 16 is mounted on the usual axle 20, which is supported at the lower end of the usual strut 22.

Control for the rocket or rockets may be accomplished in any one of several ways. One manner of accomplishment is illustrated in Figure 2. As shown in Figure 2, the rocket casing or tube 24 may be secured by means of brackets 26 to the side of wheel 16, preferably the outboard side of the wheel. I prefer that removable cartridges be loaded into the rocket tubes before each flight. The removability of the cartridges simplifies servicing of the pre-rotation mechanism.

The rockets may be ignited by electrical means, which may include a wire 28 (shown encased in non-conducting material) connected to one terminal of the rocket casing 24, and another wire 30 (also encased in non-conducting material) connected to the other terminal of the rocket casing and also connected to a collector ring 32 which rotates with the wheel, but which is electrically insulated therefrom by means of member 34. A brush 36 may have a portion 38 in constant contact with collector ring 32, and may be itself connected to a wire 40 through a terminal 42 which is mounted in but insulated from a closure member 44 provided on the end of the axle 20, said brush being spaced from said closure member to prevent electrical conduction therebetween. The wire 40 may extend, as shown, through the center of the axle to the control switch, which is indicated diagrammatically at 46. A grounded source of E. M. F. is shown diagrammatically at 47, and the wire 28 may be grounded through the wheel 16 and a brush 49 acting as a conductor between the wheel and axle 20, which is a part of the airplane body.

The control switch 46 may either be a manually operated switch in the cabin of the plane, which the operator closes whenever he wishes to set off the rockets, or it may be a switch which is automatically applied according to some preferred method. For example, the switch may be so arranged as to close when the down lock of the landing gear extension mechanism goes into place.

If desired, means may be provided for initially rotating the wheels, and the rockets may be used to supplement such means. For example, an arrangement which has been suggested (and is not per se claimed herein) consists in flaps provided in the rubber casing of the tires which are so arranged as to utilize the air flow to cause rotation of the wheel. It would be possible to provide a governor mechanism for setting off the rockets which would be operated by centrifugal force developed whenever a certain speed of rotation had been attained by the aircraft wheels. In this case, the rockets could be set off by percussion.

From the above, it will be apparent that the propulsive effect of the rockets or reaction motors 12 will cause a very rapid rotation of the wheels before the aircraft contacts the ground, thereby minimizing the sliding friction between the tires and the ground, and reducing tire wear. The number of rocket tubes used can be varied at will, depending upon the size of the rockets and the force required to develop satisfactory rotating speed of the wheel.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. Aircraft wheel pre-rotation means comprising one or more rockets secured to the wheel at a distance from its axis of rotation and so constructed and directed as to develop a propulsive force on said wheel when ignited, and means for igniting said rocket or rockets to develop such propulsive force for rotating said wheel prior to landing the aircraft.

2. Aircraft wheel pre-rotation means comprising one or more rockets secured to the wheel at a distance from its axis of rotation and so constructed and directed as to develop a propulsive force on said wheel when ignited, and means under the control of the operator for igniting said rocket or rockets to develop such propulsive force for rotating said wheel prior to landing the aircraft.

3. Aircraft wheel pre-rotation means comprising one or more rockets secured to the wheel at a distance from its axis of rotation and so constructed and directed as to develop a propulsive force on said wheel when ignited, and means for igniting said rocket or rockets to develop such propulsive force for rotating said wheel prior to landing the aircraft, said igniting means being constituted by an electrical circuit having a portion adapted to ignite the rocket or rockets and a switch under the control of the operator.

4. Aircraft wheel pre-rotation means comprising a rocket tube secured to the wheel at a distance from its axis of rotation, a removable powder cartridge in said rocket tube, said tube and cartridge being so constructed and directed as to develop a propulsive force on said wheel when the cartridge is ignited, and means for igniting said cartridge to develop such propulsive force for rotating said wheel prior to landing the aircraft.

5. Aircraft wheel pre-rotation means comprising a rocket tube secured to the wheel at a distance from its axis of rotation, a removable fuel cartridge in said rocket tube, said tube and cartridge being so constructed and directed as to develop a propulsive force on said wheel when the cartridge is ignited, and means for igniting said cartridge to develop such propulsive force for rotating said wheel prior to landing the aircraft.

6. In an aircraft having a non-rotating axle and a wheel rotatably mounted thereon, means for causing rotation of said wheel prior to landing of the aircraft comprising one or more rockets secured to the wheel at a distance from its axis of rotation and so constructed and directed as to develop a propulsive force on said wheel when ignited, and means for igniting said rocket or rockets to develop such propulsive force for rotating said wheel, said igniting means being constituted by an electrical circuit having a spark producing portion, a collector ring and brush, one of which is carried by the wheel and the other of which is carried by the axle, and a switch under the control of the operator.

7. Aircraft wheel pre-rotation means comprising one or more reaction motors secured to the wheel at a distance from its axis of rotation and so constructed and directed as to develop a propulsive force on said wheel when actuated, and means under the control of the operator for actuating said reaction motor or motors to develop such propulsive force for rotating said wheel prior to landing the aircraft.

JOHN R. CAUTLEY.

REFERENCES CITED

The following references are of record in the file of this patent:

UNITED STATES PATENTS

| Number | Name | Date |
|---|---|---|
| 370,356 | Schuetz | Sept. 20, 1887 |
| 1,681,562 | Wenstrom | Aug. 21, 1928 |
| 2,178,014 | Brown | Oct. 31, 1939 |
| 2,370,316 | Juul | Feb. 27, 1945 |